United States Patent [19]
Christy et al.

[11] Patent Number: 5,841,282
[45] Date of Patent: Nov. 24, 1998

[54] DEVICE FOR MEASURING SOIL CONDUCTIVITY

[76] Inventors: Colin Christy, 630 Gypsum; Eric Lund, 2137 Hillside, both of Salina, Kans. 67401

[21] Appl. No.: 798,222

[22] Filed: Feb. 10, 1997

[51] Int. Cl.⁶ ............................. G01R 27/26; A01C 23/00
[52] U.S. Cl. ........................ 324/347; 324/713; 324/694; 111/118; 111/903
[58] Field of Search ................................. 324/713, 715, 324/694, 347; 111/118, 903

[56] References Cited

U.S. PATENT DOCUMENTS

| | | | |
|---|---|---|---|
| 4,670,862 | 6/1987 | Staron | 324/347 |
| 5,033,397 | 7/1991 | Colburn, Jr. | 324/347 |
| 5,524,560 | 6/1996 | Carter | 324/347 |
| 5,537,045 | 7/1996 | Henderson | 324/715 |
| 5,673,637 | 10/1997 | Colburn | 324/347 |

OTHER PUBLICATIONS

"The Best Kept Secret in Agriculture: The Soil Doctor® Prescription Applicator", Sep. 1996, by Crop Technology, Inc.
"New Soil Salinity Mapping Techniques" by J. D. Rhoades and Lyle M. Carter.
Soil Doctor® Systems, Sep. 24, 1996, by Crop Technology, Inc. from http://www.soildoctor.com/.
"Variable Rate Application", Nov. 19, 1996, from http://sib.lrs.uoguelph.ca/d2\fert\9fert.htm.
Brochure — Prescription Farming™ Systems, by Crop Technology, Inc.

*Primary Examiner*—Maura K. Regan
*Attorney, Agent, or Firm*—Shook, Hardy & Bacon

[57] ABSTRACT

Device for measuring soil conductivity is comprised of a frame adapted to be conveyed over a ground surface and plurality of soil engaging coulters insulated from each other and insulatively mounted to this frame. This device also includes means for passing a current between a first pair of coulters through the soil and means for measuring this current. It further comprises means for measuring the resulting voltage between a second pair of coulters. This device for measuring soil conductivity also is comprised of electrical contact members which provide consistent electrical contact from the coulter to the means for measuring current and voltage. An electrical signal received by a coulter travels to a mounting flange and then to a dust cap. The dust cap passes this electrical signal to the spindle by way of a spring-loaded plunger. This electrical signal travels from the fixed spindle to the means for measuring current and voltage. This device is further able to calculate soil conductivity from the voltage and current measurements. In addition, the measurements from this device may be geo-referenced so as to produce a map showing the changes in soil conductivity or topsoil depth across a field. Furthermore, this device is capable of simultaneously measuring soil conductivity of at least two different soil depths in a single pass.

32 Claims, 3 Drawing Sheets

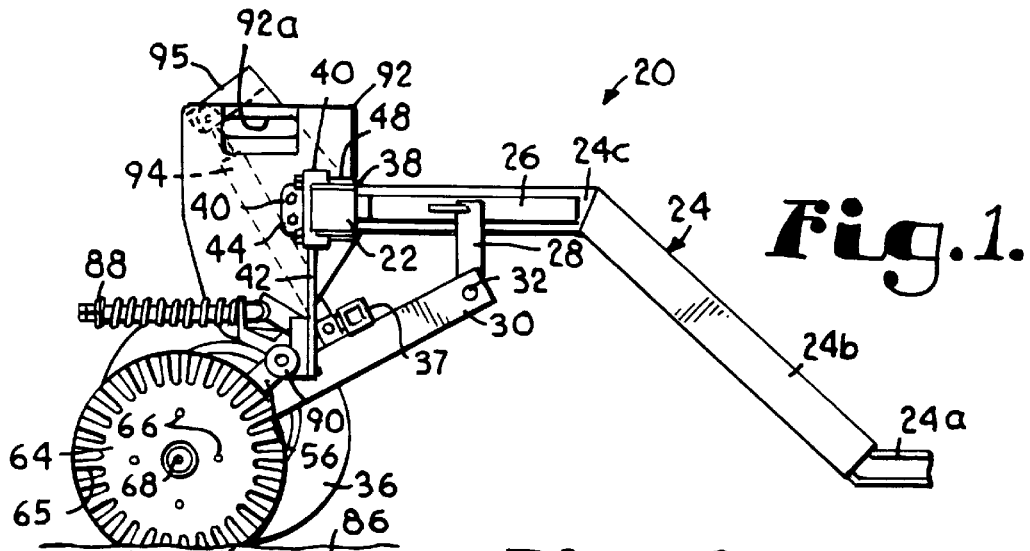
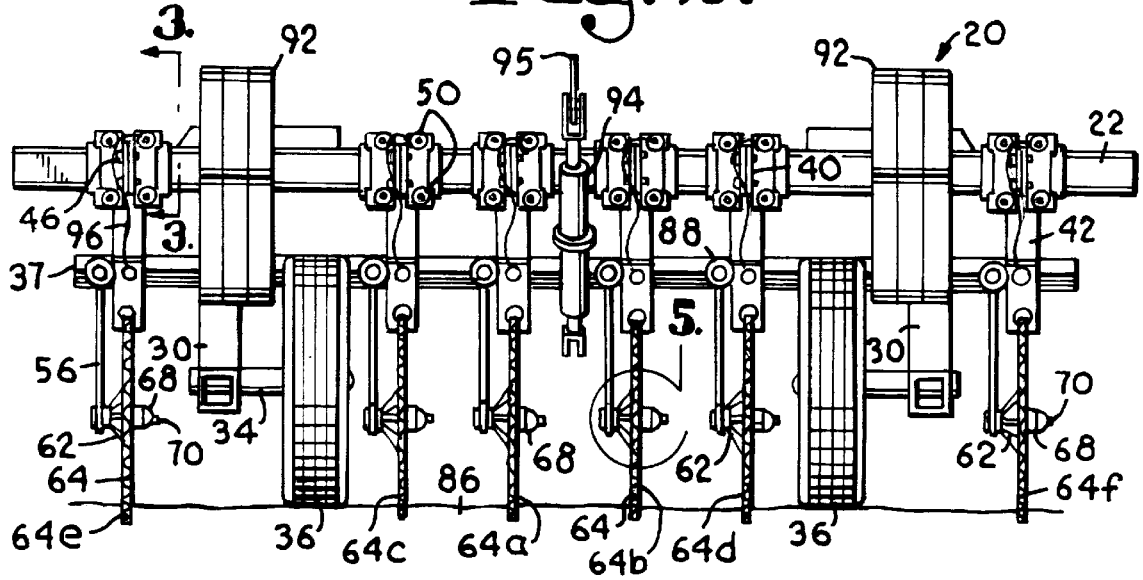
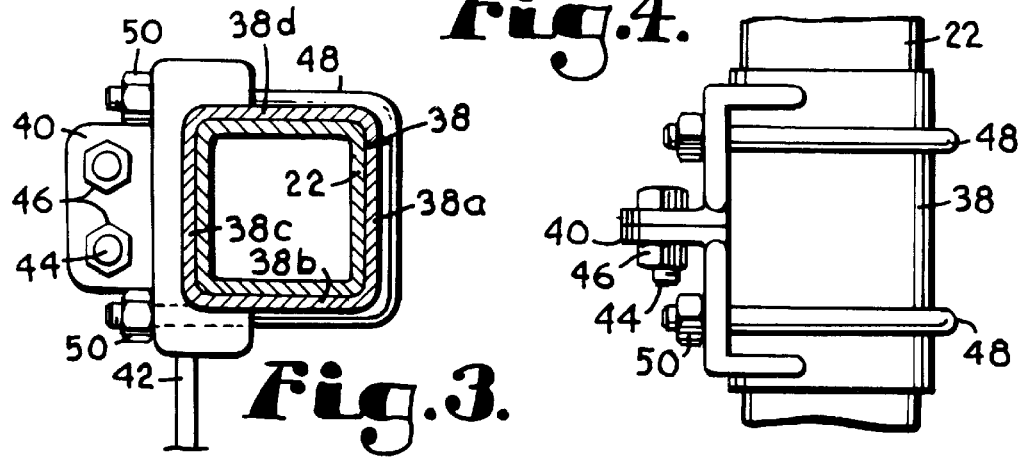

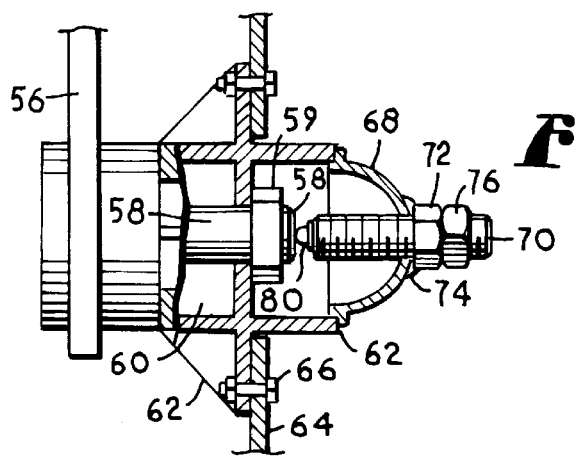
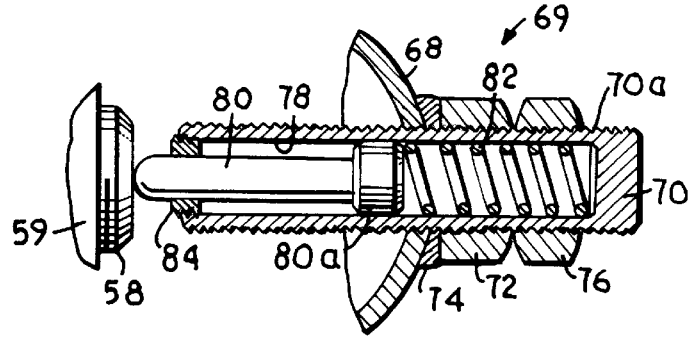
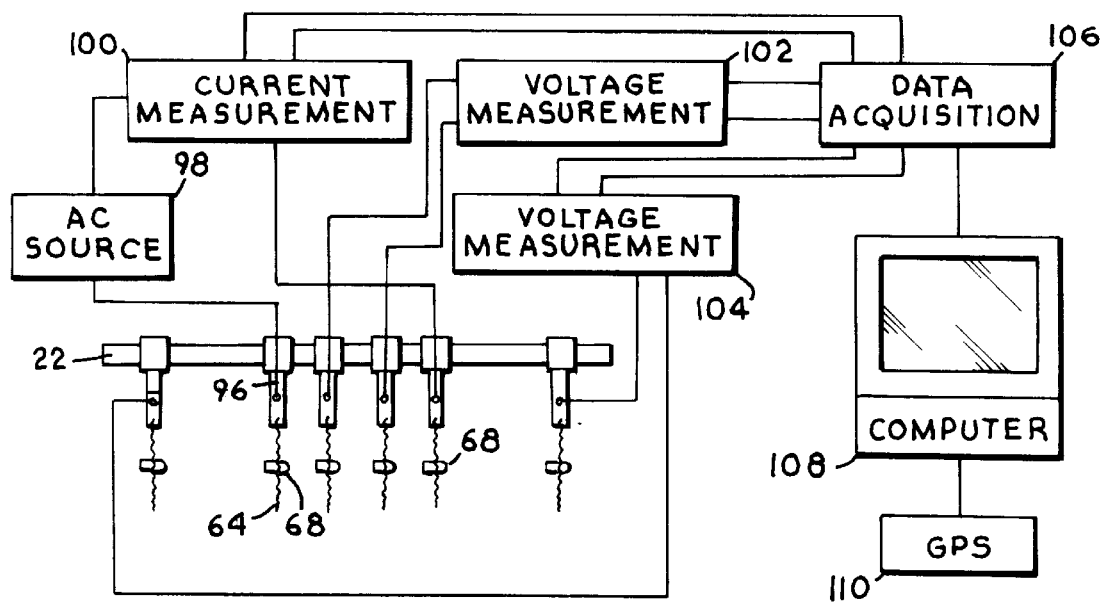

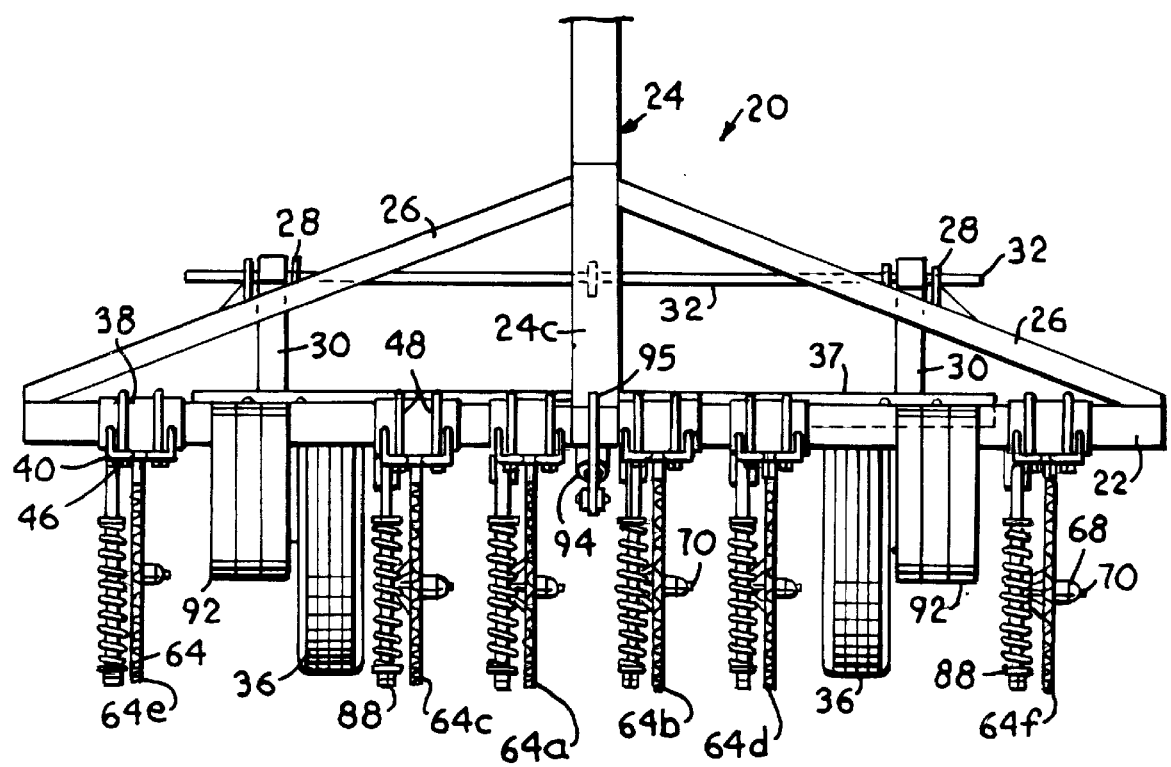

DEVICE FOR MEASURING SOIL CONDUCTIVITY

BACKGROUND OF THE INVENTION

The present invention relates to a device for measuring soil properties useful in precision farming. More specifically, the present invention relates to a system for measuring soil conductivity using a plurality of coulters attached to a frame in an array which are conveyed over a ground surface. These coulters are paired so that one pair of coulters measures current and at least one pair of coulters measures voltage. In practice each measurement is geo-referenced with a global positioning system (GPS) so that a map of conductivity can be created.

In crop management, it is beneficial to know both a soil's texture or grain size and the depth of topsoil in a particular area. Clays have the smallest grain size and the highest conductivity followed by silts and then sands and then gravel with the largest grain size and the lowest conductivity. Crop yield is affected by the sand, silt and clay content of the soil. Furthermore, if the topsoil is shallow, the water holding capacity and drainage of the soil may be limited by an underlying clay. Therefore, it is desirable to measure soil texture and topsoil depth at specific sites in a field. This information is useful in predicting crop yield potential and in determining application rates of certain herbicides, fertilizers and seed.

Several methods of obtaining data relating to soil texture and topsoil depth are currently available. One method involves using soil maps prepared with a limited number of measurements by governmental agencies, such as the United States Department of Agriculture (USDA). These maps contain qualitative descriptions of the soil's characteristics, such as its grain size at various depths. However, the minimum soil unit on these maps covers 2.2 acres, and the accuracy of the measurements taken in making these maps is extremely dependent upon the knowledge and experience of the soil scientist taking the measurements. Thus, these maps are not adequate for precision farming.

A second method available for measuring soil texture and topsoil depth is electromagnetic induction. This is a non-contact method of measuring electrical conductivity involving inducing a magnetic field into the soil and measuring the electrical current response field. This method also has several disadvantages. The device which induces the magnetic field must be operated about 10 to 15 feet away from metallic objects such as farm implements, fences, and irrigation equipment. In addition, the response field being measured may be affected by electrical noise produced by gas engines. Furthermore, this device is only capable of measuring one depth of soil at a time. Still further, this device requires onsite calibration which requires an operator to have training and experience.

A third method available for measuring soil conductivity is through the use of shanks. Electrode sensing systems are available which use four shanks to measure soil conductivity, and then use these measurements to compute the soil's salinity. By using four soil contacts, the current and voltage measurements are obtained from different shanks so as to account for imperfect contact between the shanks and the soil. Another example of a system which uses shanks is disclosed in U.S. Pat. No. 5,524,560 to Carter. Carter describes using a J-shaped positive electrode with a negative electrode immediately behind this positive electrode in the direction of travel. The J-shaped positive electrode has a wedge-shaped forwardmost face which tills the soil compacting a pathway between the positive and negative electrodes. However, both Carter's system and the four shank systems are invasive and cannot be used in minimum till farms. Furthermore, the shanks of these systems tend to become plugged with stalks and other debris commonly found in fields especially if they are closely spaced together. In addition, neither of these systems measures more than one depth of soil per pass.

Fourth, systems using two paired coulters for measuring soil properties have been introduced. However, such systems are not able to simultaneously measure the conductivity of two depths of soil using a single current source in a single pass. Also, such systems do not have each coulter insulated from each other and from the frame. Still further, they cannot compensate for imperfect contact with the soil.

A system is needed which is able to be used in minimum and no till farming. Further, a system is needed which will allow consistent electrical contact from the coulters to the electrical wires connected to the apparatus' computer system without the use of expensive conductive grease. A system is also needed which can simultaneously measure the conductivity of two different depths of soil.

SUMMARY OF THE INVENTION

It is an object of the present invention to provide a system which measures variations in soil texture and topsoil depth using a single current source and an array of coulters.

Another object of this invention is to provide a system which measures soil conductivity using coulters assembled in a Schlumberger array, a Wenner array, and/or an inverted array.

It is a further object of this invention to provide a system which is minimally invasive and thus suitable for minimum till farms.

A further object of this invention is to provide a system for measuring soil conductivity which ensures accurate measurements by providing consistent electrical contact from the coulters to the electrical wires attached to the apparatus for measuring voltage and current without the use of expensive conductive grease.

Another object of this invention is to provide a system capable of simultaneously measuring soil conductivity at two or more different soil depths using a single current source in a single pass.

Still another object of this invention is to provide a system capable of measuring the conductivity of a variety of soil depths by changing the overall length of the coulter array.

It is a further object of this invention to geo-reference soil conductivity measurements using a global positioning system so as to produce a map showing topsoil texture and depth changes across a field.

Still another object of this invention is to provide a system which performs without interference from steady state voltages produced by natural causes in the soil.

A further object of this invention is to provide a system which avoids polarizing the coulters used for measuring current and voltage.

According to the present invention, the foregoing and other objects are achieved by a system for measuring soil conductivity which includes a frame adapted to be conveyed over a ground surface and a plurality of soil engaging coulters which are electrically insulated from one another and insulatively mounted on the frame. Spindles are connected to the frame. Each spindle is cylindrically surrounded by a bearing cylinder, and each bearing cylinder is surrounded by a mounting flange. The mounting flange extends through the annular opening of a coulter. A dust cap is then secured to the mounting flange on the opposite side from the bearing cylinder. A spring-biased plunger is secured within the dust cap. An electrical signal travels from the coulter to the mounting flange and then to the dust cap. The dust cap passes this electrical signal to the spindle end by way of a spring-biased plunger. This electrical signal travels from the fixed spindle to an electrical wire attached to the apparatus for measuring current and voltage. The coulters in the present invention are used to measure current passed through the soil and the resulting voltage from this current. The system further includes means for calculating soil conductivity using current and voltage measurements.

Additional objects, advantages and novel features of the invention will be set forth in part in the description which follows, and in part will become apparent to those skilled in the art upon examination of the following, or may be learned from practice of the invention. The objects and advantages of the invention may be realized and attained by means of the instrumentalities and combinations particularly pointed out in the appended claims.

BRIEF DESCRIPTION OF THE DRAWINGS

The attached drawings are included as part of this specification and are to be read in conjunction with this specification. Like reference numerals are used to indicate like parts in various views.

FIG. 1 is a side elevational view of the apparatus of the present invention.

FIG. 2 is a rear elevational view of the apparatus of FIG. 1.

FIG. 3 is an enlarged cross-sectional view taken generally along line 3—3 of FIG. 2, parts being broken away and shown in cross-section to reveal details of construction.

FIG. 4 is a fragmentary top view of the insulated mounting structure shown in FIG. 3.

FIG. 5 is a fragmentary enlarged view of the area designated by the numeral 5 in FIG. 2, parts being broken away and shown in cross-section to reveal details of construction.

FIG. 6 is an enlarged cross-sectional view of the electrical contact member of FIG. 5.

FIG. 7 is a schematic of the measurement apparatus of the present invention and illustrates the electronic circuitry in a preferred embodiment of the present invention.

FIG. 8 is a top view of the apparatus of FIG. 1.

DETAILED DESCRIPTION OF THE PREFERRED EMBODIMENTS

An apparatus for measuring soil conductivity embodying the principles of this invention is broadly designated in the drawings by reference numeral 20 and is shown in its entirety in FIG. 1, FIG. 2 and FIG. 8. Apparatus 20 is comprised of horizontal tubing 22 which is perpendicular and attached to draw bar 24. Draw bar 24 is formed from hitch, 24a; horizontal section, 24c; and a connecting section 24b. Horizontal tubing 22 is further secured to draw bar 24 by means of two angled braces 26 on either side of horizontal section 24c.

Connected to these two angled braces 26 are two vertical brackets 28. These vertical brackets 28 are attached to gauge wheel assembly beam 30 by rod 32. At the opposite end from vertical bracket 28, each gauge wheel assembly beam 30 is attached to an axle 34. Each gauge wheel 36 rotates around an axle 34. There are two gauge wheels 36 in the preferred embodiment of this invention as shown in FIG. 2 and FIG. 8. Further securing gauge wheels 36 is cross member 37 which is attached to gauge wheel assembly beams 30 and is parallel to rod 32. This cross member 37 is secured by a nut and bolt assembly.

As shown in FIGS. 3 and 4, horizontal tubing 22 is covered by six separate insulating plates 38 each having four sides 38a–d. These insulating plates 38 surround all four sides of horizontal tubing 22 and electrically insulate the coulters from each other and the frame. Each clamp 40 is placed over an insulating plate 38 and secures each coupling bracket 42 to horizontal tubing 22. Each clamp 40 is secured by two bolts 44 and nuts 46. Further securing each clamp are two U-bolts 48 placed around each insulating plate 38. These U-bolts 48 are secured with nuts for the U-bolts 50.

Attached to each coupling bracket 42, at the opposite end from horizontal tubing 22, is mounting bracket 56. There are six mounting brackets 56 in the preferred embodiment of this invention each of which has a spindle 58 which is at the opposite end from coupling bracket 42. As shown in FIG. 5, spindle 58 is cylindrically surrounded by bearing cylinder 60. Mounting flange 62 surrounds bearing cylinder 60 extending through the annular opening in coulter 64. Coulter or rolling electrode 64 is secured to flange 62 by a nut and bolt assembly 66. The end of spindle 58 has a threaded surface to which nut 59 is attached thus securing the bearing and mounting flange to the spindle. On the opposite side from bearing cylinder 60, dust cap 68 is secured to mounting flange 62 via a press-fit or snap-type arrangement.

An electrical contact member broadly designated by reference numeral 69, as shown in FIG. 6, is used to ensure electrical contact between coulter 64 and fixed spindle 58 by way of dust cap 68. Hollow housing 70 extends through dust cap 68. It has an outer threaded surface 70a and is secured to dust cap 68 through a mating threaded surface of a nut 72 welded to dust cap 68 via bead 74. A second nut 76 is tightened on housing 70 to further secure it in place. Hollow housing 70 forms a well 78 which contains plunger 80 with plunger head 80a and spring 82 behind plunger head 80a. This forms a spring-loaded plunger within hollow housing 70. Well cap 84 surrounds plunger 80 and covers hollow housing 70. Plunger 80 extends from well cap 84 so as to touch the end of spindle 58. Housing 70 is adjustable by means of second nut 76 so as to ensure that plunger 80 contacts spindle 58.

Coulter 64, is attached to mounting flange 62 and rotates around spindle 58 through the means of bearing cylinder 60 and preferably has a fluted metal coulter edge 65 which extends into soil 86 for measuring soil conductivity. Note that non-fluted coulters may also be used in the present invention. Attached between mounting bracket 56 and coupling bracket 42 is spring 88. Pin 90 secures mounting bracket 56, coupling bracket 42 and spring 88 together and allows mounting bracket 56 to pivot. Spring 88 biases coulter 64 downwardly in a well-known manner. As coulter 64 goes across uneven ground, rocks, or clods of soil, spring 88 compresses to allow coulter 64 to raise. Once the coulter again reaches even ground, spring 88 expands to return the coulter to its normal operating position in a manner well-known in the art. Weights 92 with built-in handle 92a also are secured to horizontal tubing 22. In addition, turnbuckle 94 extends from cross member 37 to member 95 which extends upwardly from and is secured to horizontal tubing 22. Turnbuckle 94 serves as an adjustable structural support. Shortening turnbuckle 94 allows coulters 64 to go deeper into the ground. Thus, for traveling between fields, turnbuckle 94 is lengthened until coulters 64 do not contact the soil.

An electrical wire 96 is attached to each coupling bracket 42 and extends to the computer apparatus of this invention. An electrical signal received by coulter 64 travels to mounting flange 62 and then to dust cap 68. Dust cap 68 passes this electrical signal to spindle 58 by way of spring-loaded plunger (80 and 82). Thus, consistent electrical contact is provided from coulter 64 to coupling bracket 42, and electrical wire 96 is then able to transfer this electrical signal to the computer. Referring to FIG. 7, electrical wires 96 for two coulters extend from the coupling bracket 42 to apparatus for measuring current 100. One of these electrical wires 96 is also attached to an alternating current source 98. Four other electrical wires extend from coupling brackets 42 to two separate instruments for measuring voltage, 102 and 104. Both the current and voltage measurements are sent to a data acquisition unit 106 which digitizes these measurements. Data acquisition unit 106 then sends its data to computer 108 where the data can be manipulated, stored or displayed. Data from computer 108 may be geo-referenced with a Global Positioning System (GPS) 110. All measurements are taken in a manner well-known to one of ordinary skill in the art using equipment well-known in the art.

Coulters 64 can be arranged in a number of different arrays such as a Schlumberger array, a Wenner array, or a variation of one of these arrays. Specifically, one such array uses four coulters arranged as a Schlumberger or a Wenner array. Referring to the operation of this embodiment, four coulters 64a–d contact the soil 86 and preferably extend about 5–10 cm into the soil when apparatus 20 is in operation. In operation, a current is injected into the soil through outer coulter 64c and flows to outer coulter 64d. As the current flows through soil having some resistance, a voltage drop is produced. The voltage drop is measured by the two inner coulters, 64a and 64b. Soil conductivity (C) is calculated from these current (I) and voltage (V) measurements using the following formula:

$$C = k \times I/V$$

where k is a calibration constant that depends upon the spacing of the coulter array and which can be calculated in a manner well-known to one of ordinary skill in the art.

The positioning of these coulters in an array with the paired current measuring coulters, 64c and 64d, on the outside of paired voltage measuring coulters, 64a and 64b, forms a standard four electrode array. This is an effective and efficient way of measuring soil conductivity using a single current source 98. Specifically, if soil contact with one of the current measuring coulters is poor, less current will flow. However, this in turn will cause a proportionally smaller voltage drop in the soil which will be reflected by the measurement from the voltage measuring coulters. Thus, soil contact problems are accounted for in this arrangement.

Bearing cylinders 60 are usually packed with grease which is typically an insulator. Consequently, conductivity through a bearing cylinder is typically poor and varies as coulters 64 roll and move. While a conductive grease may be used to provide consistent electrical contact through the bearing, it is very expensive. Therefore, a preferred embodiment of the apparatus uses a spring-loaded plunger (80 and 82) attached to dust cap 68 which presses against each spindle end 58a. The nose of plunger 80 may be a hexagonal shape, and plunger 80 has a self-lubricating surface. Preferably, the spring-loaded plungers are steel, and most preferably, they have a stainless steel body. Hollow housing 70, which is made of a conductive material such as steel, surrounds this spring-loaded plunger. Dust cap 68 then contains housing 70 and is sturdy enough to withstand frequent contact with stalks and other debris. An electrical signal received by coulter 64 travels to mounting flange 62 and then to dust cap 68. Dust cap 68 passes this electrical signal to spindle end 58a by way of spring-loaded plunger (80 and 82). Thus, consistent electrical contact is provided from coulter 64 to wire 96 which is attached to coupling bracket 42.

The soil depth investigated by the coulter array is proportional to the overall length of the array. Specifically, the actual depth of investigation for apparatus 20 is approximately one half of the overall array length. Thus, if coulters are closely spaced, the apparatus will have a shallow depth of investigation, and if they are spaced farther apart, the apparatus will have deeper soil investigation depth.

Two gauge wheels 36 are installed on the implement to regulate the depth penetration of the coulters. These are necessary to provide a consistent depth of soil investigation and to keep the implement from bogging down in soft soils. Preferably, the gauge wheels are mounted directly in horizontal alignment with the coulters so as to provide the best depth regulation. Weights 92 are used to further cause penetration of the coulters 64 into the soil 86 which ensures adequate electrical contact between the coulters and the soil.

Depth regulation is also accomplished by turnbuckle 94 which joins horizontal tubing 22 to cross member 37. Shortening turnbuckle 94 allows the coulters to go deeper into the ground. Thus, for travel between fields turnbuckle 94 is lengthened until the coulters do not contact the soil. This turnbuckle could be replaced by a hydraulic cylinder or other similar means.

In making the above measurements, each of the coulters is electrically isolated by being mounted so as to be insulated from each other and the frame. This is accomplished by covering horizontal tubing 22, which is preferably comprised of steel, with a rugged insulating plate 38 such as a nylon plate. This insulating plate 38 covers all four sides of horizontal tubing 22 and is placed around tubing 22 underneath clamp 40 which secures coupling bracket 42.

Preferably, current source 98 provides alternating current so as to avoid polarizing coulters 64 and to avoid interference from steady state voltages produced from natural causes in the soil. Frequencies other than those used in the current and voltage measurements are filtered out so as to avoid interference.

Apparatus 20 can be attached to a pulling vehicle by a conventional hitch having a single pin, 24a; a 3-point hitch; or other means. It also can be mounted directly on a piece of tillage or application equipment. In either case, the output from apparatus 20 may be used as an input for depth or application rate control.

A preferred embodiment of this invention is capable of simultaneously measuring soil conductivity at two or more depths in a single pass using a single current source. Multiple investigation depths can be useful for determining how soil properties change with depth. Such an embodiment requires at least six coulters 64a–f operating as at least three pairs. The inner most pair, 64a and 64b, measures the voltage drop, and this measurement is used shallow soil depth investigation. The next wider pair, 64c and 64d, measures current, and this measurement is used to calculate both shallow and deep conductivity measurements. Coulters 64a–d form a standard four electrode array, as discussed above. The next wider pair of coulters, 64e and 64f (which possibly are the outer-most coulters), measures voltage drop, and this measurement is used for deep soil investigation. Coulters 64e and 64f form an inverted four electrode array with coulters 64c and 64d, the current measuring coulter pair, since the voltage electrodes are outside of the current electrodes. The system's effectiveness in measuring conductivity is unaffected by interchanging the current and voltage coulters so as to form an inverted array. Using a standard four electrode array combined with an inverted four electrode array allows at least two conductivity measurements to be obtained using a single current source. Additional voltage measuring pairs of coulters may be added to the outside of the array so as to form additional inverted arrays with coulters 64c and 64d, for measuring soil conductivity at additional depths. However, the voltage to be measured decreases with distance from the current measuring coulters, and with extremely wide arrays, the voltage may drop below that which can be reliably measured.

As discussed above, soil conductivity (C) is calculated from these current (I) and voltage (V) measurements using the following formula:

$$C = k \times I/V$$

where k is a calibration constant that depends upon the spacing of the coulter array. In addition, where coulters 64c and 64d are spaced 24 inches apart and coulters 64e and 64f are spaced 72 inches apart, the conductivity of a 1–3 feet region of soil can be estimated by the following formula:

$$C_x = 3/2(C_d - (1/3)C_s)$$

where $C_d$=deep conductivity reading, $C_s$=shallow conductivity reading and $C_x$=the estimated conductivity of the 1–3 feet region.

By measuring soil conductivity, the present invention is able to detect variations in soil texture and topsoil depth. Soil conductivity measurements are also useful as an indirect measurement of soil cation exchange capacity (CEC), the amount of organic matter in an area of soil and soil salinity. Soil salinity information is of great importance to those with irrigated farmland. In addition, the quantitative data from this device can be used in algorithms to calculate application rates of seed, fertilizer and herbicides. Furthermore, since the measurement of conductivity is nearly instantaneous, the measurements from the present invention could be used to instantaneously control seeding, tillage and herbicide and fertilizer application rates.

Conductivity measurements can be geo-referenced using a GPS which includes placing a GPS antenna above the pulling vehicle, such as on a tractor cab. Using a GPS, a map can be produced showing soil conductivity and/or topsoil depth changes across a field. Global positioning systems are available which are able to provide 10 or more data points per second. The invented apparatus is capable of taking 20 conductivity measurements per second. The global positioning system of the present invention provides one measurement per second which results in maps having 60 to 120 data points per acre depending upon the driving speed and the spacing between passes.

From the foregoing, it will be seen that this invention is one well-adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The following is claimed:

1. A system for measuring soil conductivity, comprising:
   a frame adapted to be conveyed over a ground surface;
   a plurality of soil engaging coulters insulatively mounted from said frame and insulated from each other;
   means for passing a current between a first pair of said coulters through the soil;
   means for measuring the current passed through said soil;
   means for measuring the voltage resulting from said current between a second pair of said coulters; and
   means for calculating the soil conductivity from said voltage measurement and said current measurement.

2. The system of claim 1 wherein said coulters are aligned laterally across said frame.

3. The system of claim 1 wherein said second pair of coulters are arranged between said first pair of coulters.

4. The system of claim 3 further comprising:
   a third pair of coulters, said second pair of coulters positioned between said third pair of coulters;
   means for measuring the voltage resulting from said current between said third pair of coulters; and
   means for calculating the soil conductivity of a second level utilizing the voltage measurement between said third pair of coulters and said current measurement.

5. The system of claim 1 further comprising a global positioning system wherein each measurement is geo-referenced so as to produce a map showing changes in soil conductivity across a field.

6. A system as in claim 5 wherein said global positioning system produces between 60 and 120 data points per acre.

7. The system of claim 1 further comprising electrical contact members in contact with said coulters wherein said electrical contact members provide consistent electrical contact from said coulters to said means for measuring current and voltage.

8. The system of claim 1 wherein said current is alternating current.

9. A soil engaging electrical contact apparatus for use in an agricultural sensing device having a frame and an electrical measuring structure, the apparatus comprising:
   a spindle adapted to be attached to the frame and in electrical contact with the electrical measuring structure;
   a soil penetrating disc rotatably mounted to said spindle through a bearing;
   a dust cap for covering said bearing and in electrically conductive contact with said disc; and
   an electrical contact member positioned between said dust cap and said spindle to ensure that said disc is conductively connected to said spindle.

10. The soil engaging apparatus of claim 9 wherein said contact member has an elongated body attached to said dust cap and a spring biased plunger received in said body and in contact with said spindle.

11. The soil engaging apparatus of claim 10 wherein said body has an outer threaded surface that is received in a mating threaded surface presented by said dust cap.

12. The soil engaging apparatus of claim 9 wherein said contact member is biased towards said spindle.

13. A device for measuring soil conductivity, comprising:
   a frame;
   at least four spindles;
   at least four brackets each connected to a spindle at one end and attached to said frame at the opposite end;

at least four coulters electrically insulated from each other and from said frame wherein said coulters are mounted on mounting shafts which cylindrically surround and rotate around said spindles;

dust caps in electrical contact with said coulters;

means for measuring current with a first pair of said coulters;

means for measuring voltage resulting from a current between said first pair of coulters with at least a second pair of said coulters;

means for calculating soil conductivity using voltage and current measurements; and electrical contact members attached between said dust caps and said spindles wherein said electrical contact members provide consistent electrical contact from said coulters to said means for measuring current and voltage.

14. A device of claim 13 further comprising at least two gauge wheels attached to said frame wherein said wheels regulate the penetration depth of said coulters into the soil.

15. A device of claim 13 wherein said gauge wheels are mounted laterally across said frame.

16. A device of claim 13 wherein said current is alternating current.

17. A device of claim 13 wherein said means for measuring current and voltage includes a plurality of wires attached to said brackets.

18. A device of claim 13 wherein said device has six coulters.

19. A device of claim 13 wherein said electrical contact member has an elongated body attached to said dust cap and a spring biased plunger received in said body and in contact with said spindle.

20. A device of claim 19 wherein said elongated body has an outer threaded surface that is received in a mating threaded surface presented by said dust cap.

21. A device of claim 13 wherein said electrical contact member is biased towards said spindle.

22. A device of claim 13 further comprising a global positioning system wherein each measurement is geo-referenced so as to produce a map showing changes in soil conductivity across a field.

23. A system as in claim 22 wherein said global positioning system produces between 60 and 120 data points per acre.

24. A system as in claim 13 wherein said voltage and current measurements can be used to calculate application rates of seed, fertilizer or herbicides.

25. A device for simultaneously measuring the soil conductivity of at least two different soil depths, comprising:

a frame adapted to be conveyed over a ground surface;

at least six brackets each having a spindle at one end and attached to said frame at the opposite end;

at least six coulters electrically insulated from each other and from said frame wherein said coulters are mounted on mounting shafts which cylindrically surround and rotate with respect to said spindles;

a current source which passes through a single pair of coulters;

means for measuring current with said coulters;

means for simultaneously measuring the voltage differential resulting from said current across at least two different soil depths with said coulters; and means for calculating soil conductivity using voltage and current measurements.

26. A device as in claim 25 further comprising at least two gauge wheels attached to said frame wherein said wheels regulate the penetration depth of said coulters into the soil.

27. A device as to claim 25 wherein said means for measuring current and voltage includes a plurality of wires attached to said mounting brackets.

28. A device as in claim 25 further comprising a global positioning system wherein each measurement is geo-referenced so as to produce a map which shows topsoil depth changes across a field.

29. A device as in claim 25 further comprising electrical contact members in contact with said coulters wherein said electrical contact members provide consistent electrical contact from said coulters to said means for measuring current and voltage.

30. A device for simultaneously measuring the soil conductivity of at least two different said depths, comprising:

a frame adapted to be conveyed over a ground surface;

at least six soil contact members insulatively mounted from said frame and insulated from each other;

means for passing a current between a first pair of soil contact members through the soil;

means for measuring the current passed through said soil;

means for measuring the voltage between a second pair of soil contact members;

means for measuring the voltage between a third pair of soil contact members; and means for calculating the soil conductivity of at least two soil levels from said voltage resulting from said current measurements and said current measurement.

31. A device of claim 30 wherein said soil contact members are coulters.

32. A device of claim 30 wherein said second pair of soil contact members are arranged inside said first pair of soil contact members and said third pair of soil contact members are placed on the outside of said first pair.

* * * * *